Sept. 11, 1962　　　F. H. AMREIN　　　3,053,111
SPEED-SETTING DEVICE
Filed Dec. 1, 1958
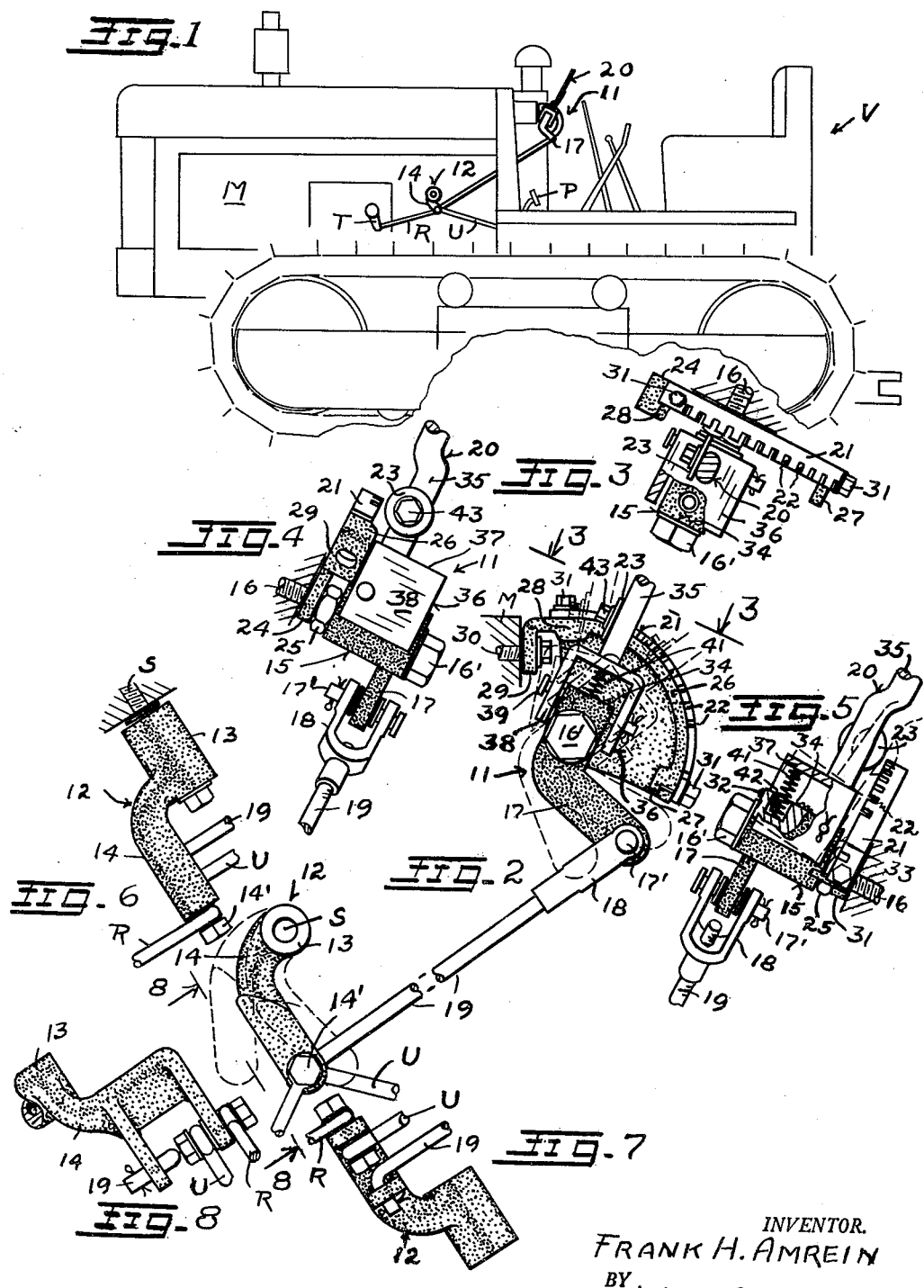
INVENTOR.
FRANK H. AMREIN
BY Henry N. Young
ATTORNEY United States Patent Office 3,053,111
Patented Sept. 11, 1962

3,053,111
SPEED-SETTING DEVICE
Frank H. Amrein, 600 North N Place, Tulare, Calif.
Filed Dec. 1, 1958, Ser. No. 777,428
1 Claim. (Cl. 74—533)

The invention relates to a unitary setting device for a control member which is rockably adjustable about a fixed axis of pivoting for a useful purpose, and more specifically relates to the application of the device to set and maintain the travel speed of a motor-driven vehicle at an adjusted value.

In the operation of a motor-driven tractor or other vehicle used for personal transportation or as a draft vehicle or in ground-working operations, the usual pedal control of the motor vehicle for determining the travel speed of the vehicle may be desirably replaced or supplemented by the present speed-setting device, whereby to eliminate the tediousness of a pedal control by the vehicle operator while leaving the operator free for other activities, and a primary object of the present invention is to provide an adjustable speed-setting unit which is particularly adapted for use with the motors or engines of self-propelled vehicles.

A more general object is to provide a device of the character described which is adapted for its ready installation in combination with controlled elements generally.

A further object is to provide a control unit of the character described which is particularly simple in structure and dependable in its action.

The invention possesses other objects and features of advantage, some of which, with the foregoing, will be set forth or be apparent in the following description of a typical embodiment and installation thereof, and in the accompanying drawings, in which, FIGURE 1 is a schematic side elevation of a tractor which is arranged for its propulsion by an internal combustion engine thereof, and indicates an engine-mounted application of the present setting unit to the tractor for effecting the adjustable positioning of an engine-mounted controlled member which regulates the supply of fuel to the engine.

FIGURE 2 is an enlarged fragmentary elevation of the installed combination of the setting unit and the controlled member shown in FIGURE 1.

FIGURE 3 is a view of the setting unit taken from the line 3—3 in FIGURE 2.

FIGURE 4 is a left-side view of the setting unit of FIGURE 2.

FIGURE 5 is a partly sectional right-side view of the unit.

FIGURE 6 is a top view of the controlled member of FIGURE 2.

FIGURE 7 is an underneath view of the controlled member.

FIGURE 8 is a view taken from the line 8—8 in FIGURE 2.

For illustrating my invention, a setting unit 11 is shown as operatively associated with the internal combustion engine M of a tractor V, and is provided with the usual clutch and brake levers in the operator's compartment and a rockable fuel-feed control member 12 carried in a normal manner on a stub shaft S extending laterally from the engine block. The controlled member 12 comprises a tubular hub portion 13 provided with a radial lever arm 14 having a forked outer end mounting a pivot pin 14' arranged for the connection thereof by means of a push-and-pull rod R with the end of a shaft-carried crank arm T by which the supply of fuel to the engine from a pump or carburetor (not shown) is controllable. A push-and-pull rod U may extend from the pin 14' at the outer end of the lever arm 14 to a suitable connection with a usual pedal P in the operator's compartment to provide for a usual foot-throttle control for the engine.

The present setting unit 11 is shown as mounted at or adjacent a rear upper point of the engine M, and in part comprises a hub 15 which is rotatably mounted on the outer end portion of the shank of a tap bolt 16 behind the head 16' thereof, with said bolt extending from the engine block as a stub shaft in longitudinally adjustable fixed mounted engagement in the block. The hub 15 is provided with a radial lever arm 17 extending rigidly therefrom and is connected to the pin 14' of the arm 14 of the controlled member 12 by a push-and-pull rod connection; as particularly shown, a clevis 18 pivoted to the arm 17 at a pin 17' and having its shank threadedly receiving an end portion of a rod 19 extending from the pin 14' provides a connection of adjustable effective length between the arms. The hub member 15 is manually adjustable about the mounting bolt 16 by the use of a setting arm 20 extending radially from it and movable in a plane opposite a member 21 which is mounted on the engine and provides a set of notches 22 arranged in an arcuate line having its center in the axis of the bolt and adapted to selectively receive a dogging projection or dog 23 provided on the setting arm.

As particularly shown, the notch-providing member 21 is carried by a generally sector-shaped plate member 24 provided therethrough at the center of its arch with a transverse opening which complementarily receives the arm-mounting bolt 16 through it for its non-rotatively fixed mounting on the installed bolt by means of a lock-nut 25 mounted on the bolt between it and the hub 15 of the arm 17 for fixedly clamping the plate against the opposed engine part. The arcuate edge portion of the present member 24 is provided with a flange 26 extending toward the zone of rocking of the arm 20, and said flange is terminally provided with inwardly directed stop projections 27 and 28 for confining the arm movement between them. As shown, the projection 28 has a flat portion 29 extending radially of the bolt axis and provided with a transverse hole for receiving therethrough a tap bolt 30 for additionally securing the member 24 to the opposed engine part, whereby to supplement the holding action of the lock-nut 25 and assure the non-rotatively fixed mounting of the member on the engine. Preferably, and as shown, the notch-providing member 21 comprises an elongated arched element which complementarily fits and is replaceably secured to the arcuate edge of the member 24 at the flange 26 by means of tap bolts 31.

As shown, the hub 15 of the unit 11 has flat side faces 32 and 33 which are parallel to each other and to its longitudinal bolt-receiving bore, and a top face 34 which is perpendicular to the side faces 32 and 33 and is parallel to said bore, the setting member 20 comprises a lever arm 35 extending integrally from a base 36 which is swingably attached to the hub 15 for a manual rocking of the arm in a plane parallel to the bolt axis. As particularly shown, the base 36 comprises a channel-shaped member having the arm 35 extending integrally from its web portion 37, while the flange portions 38 of said base mutually span the hub and are swingably attached to the hub by a hinge pin 39 extending through the ends of the hub and the base flanges 38 nearest the member 27. A helical compression spring 41 extends from a socket 42 provided in the outer end of the hub 15 to constantly engage the opposed under side of the base portion 37 at a seat provided about an anchoring projection of the portion, and said spring is arranged to constantly urge the swinging of the arm toward the notch-providing member 21.

The dogging projection 23 of the setting arm 20 preferably comprises a readily replaceable element, since this member and the teeth defining the sides of the notches of the replaceable member 21 are the only elements of the setting unit which may become appreciably worn during their use. As particularly shown, the member 23 comprises a flat washer-shaped element replaceably secured to the setting arm 20 for its rotary adjustment about a tap bolt 43 extending through its central opening and engaged in the arm in such a position that a peripheral portion of the member 23 extends from the arm for its dogging engagement in a selected notch 22 of the member 21. It will be understood that the mounted member 23 may be rotatively adjusted for the dogging use of unworn edge portions thereof, or, as the member 21, may be readily and inexpensively replaced, whereby to provide for a ready maintenance of the present setting unit 11 in an operative condition with a minimum requirement for replaceable parts.

In operatively installing the present setting device for a rockable member comprising the controlled member 12 by which the fuel-control crank arm T may be set, it will be understood that the hub portion 13 of the member 12 would be rockably mounted on the stub shaft S, and the setting unit 11 would have its hub 15 rockably mounted on the bolt 16 while it extends through the plate portion 24 of the member 21 and carries the lock-nut 25 between said plate portion and the opposed end of the hub 15. Having the dogging member 23 engaged in a notch 22' adjacent one end of the member 21, the push-and-pull rod-and-clevis connection 19—18 is installed and the bolt 16 then tightened to secure the member 21 in set position on the mounting engine, after which the effective length of the connection 19—18 may be adjusted as required to appropriately dispose the crank arm T in "closed- throttle" position. By particular reference to FIGURES 1 to 3 of the drawings, it will be noted that the setting arm 20 is shown as it may be subsequently set for a substantially full-throttle positioning of the crank arm T.

It will now be understood that, having the appropriately related threaded bores for receiving the inner ends of the mounting tap bolts 16 and 30 for a present unit 11 provided by or adjacent a controlled motor M, and the notch-providing assembly 21 mounted in its place, the setting arm 20 would be disposed at "closed-throttle" position for the arm, and appropriate push-and-pull connections of suitably adjusted effective length and form would be extended to a controlled member, as the member 12 or the throttle-control arm T, from the arm 17 of the hub 15. While the present arrangement assumes that the carrying structure provides the bores for directly receiving the attaching bolts for the setting unit, it will be obvious that a common adapter base member might provide said bores in appropriate relation for mounting the unit on the member, and that such a mounting member may in turn be arranged for its suitably fixed mounting where required on a supporting engine or vehicle fire-wall or other support without departing from the spirit of the present invention.

From the foregoing description taken in connection with the accompanying drawings, the advantages of the present setting unit will be readily understood by those skilled in the art to which the invention appertains. While I have shown and described a structure and operative installation which I now consider to comprise a preferred embodiment of my invention, I desire to have it understood that the showings are primarily illustrative, and that such changes and developments may be made, when desired, as fall within the scope of the following claim.

I claim:

In combination with a push-and-pull element controlling the fuel supply to an internal combustion engine, a control member which is rockably adjustable about a fixed axis of pivoting with respect to the engine, the control member operatively connected to the push-and-pull element, a cylindrically arcuate rack plate fixedly related to the engine in coaxial relation to the rockable member and toothed from and along a side edge thereof to provide a rack having rectangular dog-receiving notches directed axially of the axis of pivoting for the control member, a setting arm pivoted on the control member for swinging about an axis perpendicular to the member axis, an annular element of uniform thickness fixedly carried on said arm for swinging therewith and providing an edge portion arranged for the substantially fitted engagement thereof in a selected said rack notch as a dogging tooth, a bolt means engaged through the central opening of the annular element and engaged in the arm in parallel relation to the axis of swinging of the arm to provide a rotatively adjustable fixed mounting of the element on the arm for selectively disposing different edge portions of the element beyond the arm as a dogging tooth in the selected rack notch, and a means constantly and directly coactive between the control member and said arm to yieldingly urge the retention of said dogging tooth portion of the element in the receiving notch of the rack plate.

References Cited in the file of this patent

UNITED STATES PATENTS

| 149,129 | Hoyt | Mar. 31, 1874 |
| 303,264 | Cardwell | Aug. 12, 1884 |
| 525,807 | Ensign | Sept. 11, 1894 |
| 700,779 | Kent | May 27, 1902 |
| 881,088 | Thum | Mar. 3, 1908 |
| 1,806,783 | Brand | May 26, 1931 |
| 1,820,097 | Spry | Aug. 25, 1931 |
| 1,937,740 | Woolson | Dec. 5, 1933 |
| 2,328,211 | Harper et al. | Aug. 31, 1943 |

FOREIGN PATENTS

| 448,160 | Great Britain | June 3, 1936 |